United States Patent [19]

Travlos

[11] Patent Number: 4,715,549
[45] Date of Patent: Dec. 29, 1987

[54] WIRE CARRIER AND LOADING APPARATUS

[75] Inventor: Constantine M. Travlos, Baltimore, Md.

[73] Assignee: The United States of America as represented by the Secretary of the Air Force, Washington, D.C.

[21] Appl. No.: 35,333

[22] Filed: Apr. 7, 1987

[51] Int. Cl.⁴ .............................................. B65H 54/00
[52] U.S. Cl. ...................................... 242/25 R; 242/47; 242/78; 242/117; 242/125.1; 242/129; 242/171
[58] Field of Search ....................... 242/25 R, 18 R, 47, 242/54 R, 129, 125.1, 117, 170, 171, 164, 159, 1, 77, 78, 78.1, 25 A

[56] References Cited

U.S. PATENT DOCUMENTS

| | | |
|---|---|---|
| 2,811,322 | 10/1957 | Wilkinson .......................... 242/117 |
| 2,846,162 | 8/1958 | Allin, Sr. et al. ................... 242/117 |
| 2,987,267 | 6/1961 | Hayes et al. ...................... 242/125.1 |
| 3,895,762 | 7/1975 | Fletcher, Jr. et al. ............. 242/25 R |
| 3,994,058 | 11/1976 | Sasaki ............................ 242/25 R X |
| 4,089,486 | 5/1978 | Carter ................................ 242/129 |
| 4,531,682 | 7/1985 | Schroder et al. ............... 242/129 X |
| 4,557,423 | 12/1985 | Zingler .......................... 242/25 A X |
| 4,638,558 | 1/1987 | Eaton ................................. 242/129 |
| 4,664,329 | 5/1987 | Pali .................................... 242/78 |

Primary Examiner—Stanley N. Gilreath
Attorney, Agent, or Firm—Richard J. Donahue; Donald J. Singer

[57] ABSTRACT

Wire carrier and loading apparatus for use with a robot-arm-manipulated wire routing tool in the fabrication of wire harnesses. The wire carrier assembly and associated drive assembly include means for jointly grasping the end of the wire as it is inserted into the wire carrier and winding the wire onto the spool of the carrier.

5 Claims, 2 Drawing Figures

WIRE CARRIER AND LOADING APPARATUS

STATEMENT OF GOVERNMENT INTEREST

The invention described herein may be manufactured and used by or for the Government for governmental purposes without the payment of any royalty thereon.

BACKGROUND OF THE INVENTION

This invention relates generally to wire dispensing apparatus, and more particularly to a wire carrier assembly and associated wire loading drive assembly for use in conjunction with a robot-arm-manipulated tool in the fabrication of wire harnesses.

A complete wire harness typically comprises a multiplicity of wires configured in a desired bundled layout, with the ends of each wire being terminated in a desired manner. For example, a particular wire may have a contact affixed to each of its ends, where each contact is to be inserted into a contact holding device, such as a connector plug. In complex arrangements, numerous wires of varying lengths and types can be included in a single wire harness. In these situations, the manual fabrication of the wire harness is a particularly laborious and time consuming task.

Fully automated fabrication is a sought-after goal in the cost effective production of wire harnesses. Such wire harnesses are preferrably assembled by means of manipulable tools, sometimes called end-effectors, which are attached to robotic arms and can route wires in predetermined paths, or insert contacts of varying styles into connectors, or both. An example of a combined contact insertion and wire routing tool for manufacturing wire harnesses is disclosed in U.S. Pat. No. 4,549,347, issued to the present inventor on Oct. 29, 1985.

One of the more important elements of such an automated wire harness fabrication system is the wire carrying device. It must be constructed to facilitate the loading of a wire therein at a wire prep station, be readily transportable from the wire prep station to a wire harness formation station without damaging the wire or its contact terminations, and be tailored to the specific needs of the wire routing end-effector tool at the harness formation station.

Additional considerations affecting the wire carrier design include its cost and its capability to hold single wires and cables of lengths ranging from 6 inches to 12 feet. Such wires may have American gauge conductor sizes ranging from 16 to 24, and insulation thicknesses of 0.003 to 0.010 inches. The cables to be held and dispensed by the carrier may consist of prepared coaxial wires, prepared twisted wire cables, (twisted pairs being the most common) and shielded cables. The prepared cables may have outside diameters of up to 0.25 inches. Both wires and cables may have tinned ends, ends prepared with MIL-C-39029 crimp contacts or ends prepared with MS 25036 crimp lugs.

Various wire and cable containing and dispensing devices are presently known in the art. Examples of such devices are disclosed in U.S. Pat. Nos. 2,811,322; 2,846,162; 2,987,278; and 4,089,486. Unfortunately no prior art wire carriers exist which satisfy all of the criteria mentioned herein and a continuing need exists for improvements in such devices.

OBJECTS OF THE INVENTION

It is therefore the primary object of the present invention to provide a wire carrier of improved design for use in an automated wire harness fabrication system.

It is a more specific object of the present invention to provide a shroud-protected wire carrier having means for introducing a wire therein and facilitating the loading of the wire into the carrier.

It is a further object of the present invention to provide a wire carrier assembly and associated drive assembly for loading a wire therein.

SUMMARY OF THE INVENTION

In accordance with the present invention, a wire carrier assembly comprises a wire carrying spool with a shroud having a wire loading and dispensing port therethrough. During the wire loading operation, the spool is placed on a wire loading drive assembly comprising a rotor with a slip plate mounted thereon. A wire end is inserted through the port in the shroud and passes through a longitudinal slot in the spool. The rotor of the drive assembly is rotated causing a wire retaining pin thereon, which passes through matched arcuate slots in the slip plate and spool, to grip the wire and wind the wire about the spool.

BRIEF DESCRIPTION OF THE DRAWINGS

The foregoing and other objects, advantages and features of the invention will become apparent from the following detailed description of the preferred embodiment of the invention, as illustrated in the accompanying drawings.

DETAILED DESCRIPTION OF THE INVENTION

Figure 1:
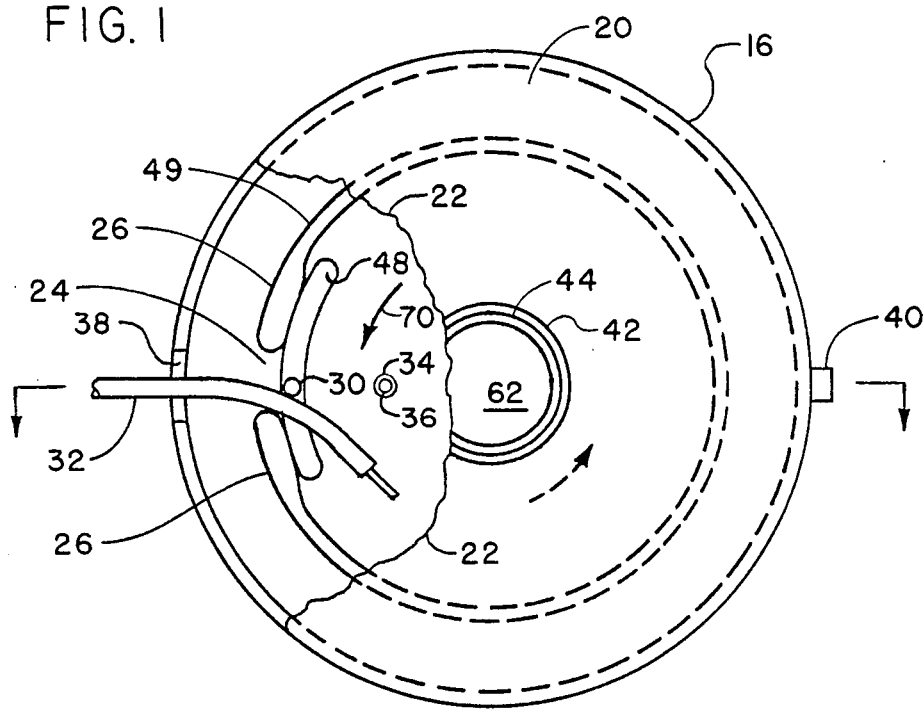
FIG. 1 is a top view of the preferred embodiment of the wire carrier assembly and wire loading drive assembly of the present invention.

The present invention concerns two mated but separable assemblies; a wire carrier assembly 16 and a wire loading drive assembly 18. In FIG. 1 of the drawings, a part of the shroud 20 of the wire carrier assembly 16 has been cut away long line 22 to expose and more clearly illustrate underlying parts of the invention, such as the longitudinal opening 24 and enlarged bearing surfaces 26 of the wire containing spool 28, the wire retaining pin 30 which captures the end of a wire 32, and the drive pin hole 34 and drive pin 36 which mate to interlock wire carrier assembly 16 and drive assembly 18. Also visible in this view is the port 38 in shroud 20 through which wire 32 is introduced during the wire loading process, and a tab 40 which is used to index wire carrier 16 when mounted on a wire routing tool.

Figure 2:
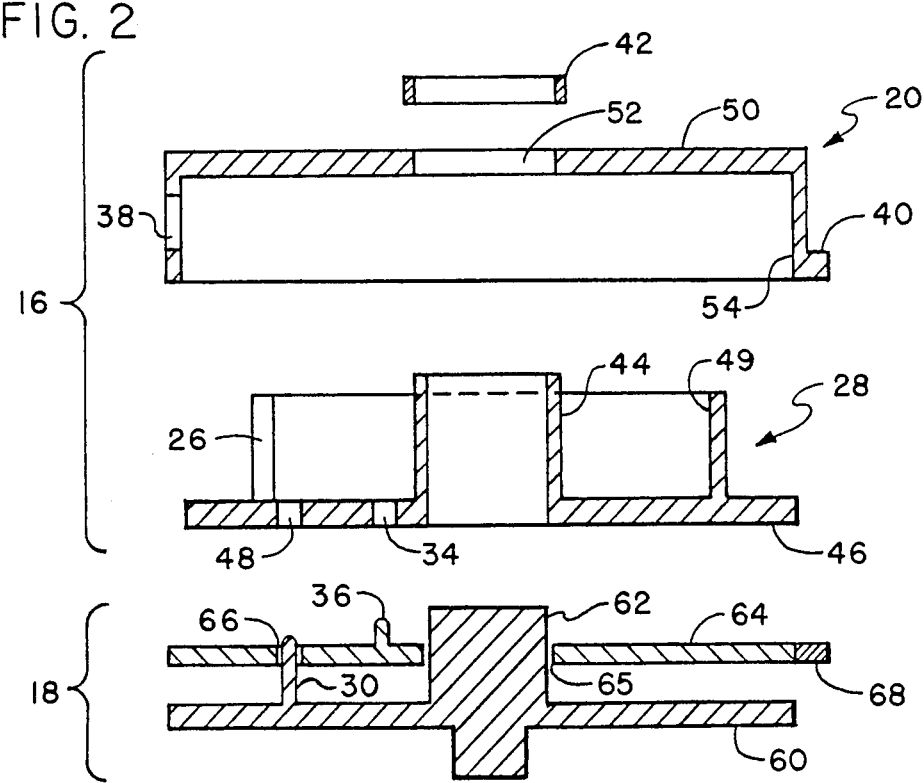
FIG. 2 is an exploded sectional view of the wire carrier assembly and wire loading drive assembly of the present invention as observed along the line 2—2 of FIG. 1.

FIG. 2 is a sectioned side view of the invention which has been expanded to better illustrate the various parts of the wire carrier assembly 16 and its wire loading drive assembly 18.

As seen in FIG. 2 of the drawings, wire carrier assembly 16 comprises three components; wire carrying spool 28, shroud 20, and shroud retainer ring 42. Spool 28 has a spool hub 44 coaxially affixed to a disk-shaped spool base plate 46. Spool base plate 46 has drive pin hole 34 and an arcuate slot 48 formed therethrough, the functions of which are described in detail below.

Wall 49 of spool 28 is enlarged in thickness on each side of longitudinal opening 24 to provide bearing surfaces 26 which, as best seen in FIG. 1, are aligned with the outer edge of arcuate slot 48 on spool base plate 46. Shroud 20 has a disk-shaped end 50 with a centrally located hole 52 therein which accepts hub 44. Shroud 20 also has a rim 54 thereon which protects the spool 28 and the wire which is wound thereon. Tab 40 is used to register the wire carrier assembly 16 at the wire loading and harness formation stations. Shroud 20 is held on spool hub 44 by retaining ring 42.

Drive assembly 18 comprises a disk-shaped rotor 60 having a centrally located shaft 62, and a disk-shaped slip plate 64 having a centrally located mounting hole 65 which accepts shaft 62. Slip plate 64 also has an arcuate slot 66 which accepts wire retaining pin 30 projecting from rotor 60, and a drive pin 36 which fits within drive pin hole 34 when wire carrier assembly 16 is mounted on drive assembly 18. Arcuate slot 66 in slip plate 64 is identical in length and radius to arcuate slot 48 in spool base plate 46, and is positioned directly therebelow when slip plate 64 and spool base plate 46 are rotationally aligned as shown in the drawings. A drag force is also applied perpendicular to the circumference of slip plate 64 by means of a friction pad 68 or the like.

To load a wire into the wire carrier assembly 16 at a wire prep unloading station, wire carrier assembly 16 is mounted onto drive assembly 18 which in turn is coupled to a driving source, such as an electric motor, a stepper motor or the like. Drive pin 36 on slip plate 64 mates with the drive pin hole 34 in spool base plate 46. Wire retaining pin 30 in rotor 60 moves freely within arcuate slots 66 and 48 in slip plate 64 and spool base plate 46 respectively.

Initially wire retainer pin 30 is at an end of slots 48 and 66. The end of wire 32 is inserted through the port 38 in shroud 20 and through the longitudinal opening 24 in spool 28. When a sufficient length of wire has been inserted, rotor 60 is rotated in the direction indicated by arrow 70. When rotor 60 is first rotated, the drag applied to slip plate 64 by friction pad 68 causes slip plate 64 to resist rotation. Wire retainer pin 30 will translate within slip plate arcuate slot 66 and spool base plate slot arcuate 48 in the direction of rotation 70, capturing wire 32 and forcing it against one of the spool bearing surfaces 26. The force of the wire retainer pin 30 pushing on bearing surface 26 causes the spool to rotate, thus winding wire 32 onto spool 28.

Drive pin 36 keeps spool 28 from turning with respect to slip plate 64 making it possible to transmit the drag force from slip plate 64 to spool 28. Without driving pin 36, the pinching of the wire would not take place because spool 28 would be able to rotate freely and not oppose the pinching action of wire retaining pin 30.

Although the invention has been described with reference to a particular embodiment thereof, numerous adaptations and modifications of the invention will be apparent to those of skill in the art and hence it is intended by the appended claims to cover all such modifications and adaptations as fall within the spirit and scope of the invention.

What is claimed is:

1. Apparatus comprising:
   a wire carrier assembly having a wire-carrying spool, a shroud and a shroud retainer;
   said spool comprising a hollow cylinder having a first end and a second end and a longitudinal opening extending throughout the wall thereof, a disk-shaped base plate concentrically disposed at said first end of said cylinder and having a tubular hub extending coaxially through and beyond said second end of said cylinder, said base plate further having an arcuate slot therethrough adjacent the interior surface of said wall of said hollow cylinder and spanning said opening in said cylinder, said base plate further having a drive pin hole therethrough and located within the radius of said arcuate slot;
   said shroud comprising a circular cover having a mounting hole at the center thereof and a rim extending from a side thereof, said rim having a wire insertion and dispensing port therethrough, said hub on said base plate of said spool extending through said mounting hole in said shroud;
   said shroud retainer comprising a ring positioned over the distal end of said tubular hub of said base plate.

2. Apparatus as defined in claim 1 and further comprising wire carrier registration means disposed on said rim of said shroud.

3. Apparatus as defined in claim 2 and further comprising:
   a wire loading drive assembly engaging said wire carrier assembly, said wire loading drive assembly comprising:
   a disk-shaped slip plate and a disk-shaped rotor;
   said slip plate having a central hole, a drive pin engaging said drive pin hole in said base plate of said spool, and an arcuate slot therethrough of substantially the same radius and length as said arcuate slot in said base plate of said spool;
   said rotor having a central shaft projecting through said central hole in said slip plate and engaging said tubular hub on said spool, and a wire retaining pin projecting therefrom through said arcuate slot in said slip plate and through said arcuate slot in said base of said spool.

4. Apparatus as defined in claim 3 wherein the wall thickness of said hollow cylinder of said spool is enlarged adjacent said opening in said cylinder to provide wire bearing surfaces.

5. Apparatus as defined in claim 4 and further comprising:
   means for applying a frictional force to said slip plate.

* * * * *